Dec. 22, 1964   E. SHOHAN   3,162,469
PIPE COUPLER
Filed Feb. 14, 1961   2 Sheets-Sheet 1
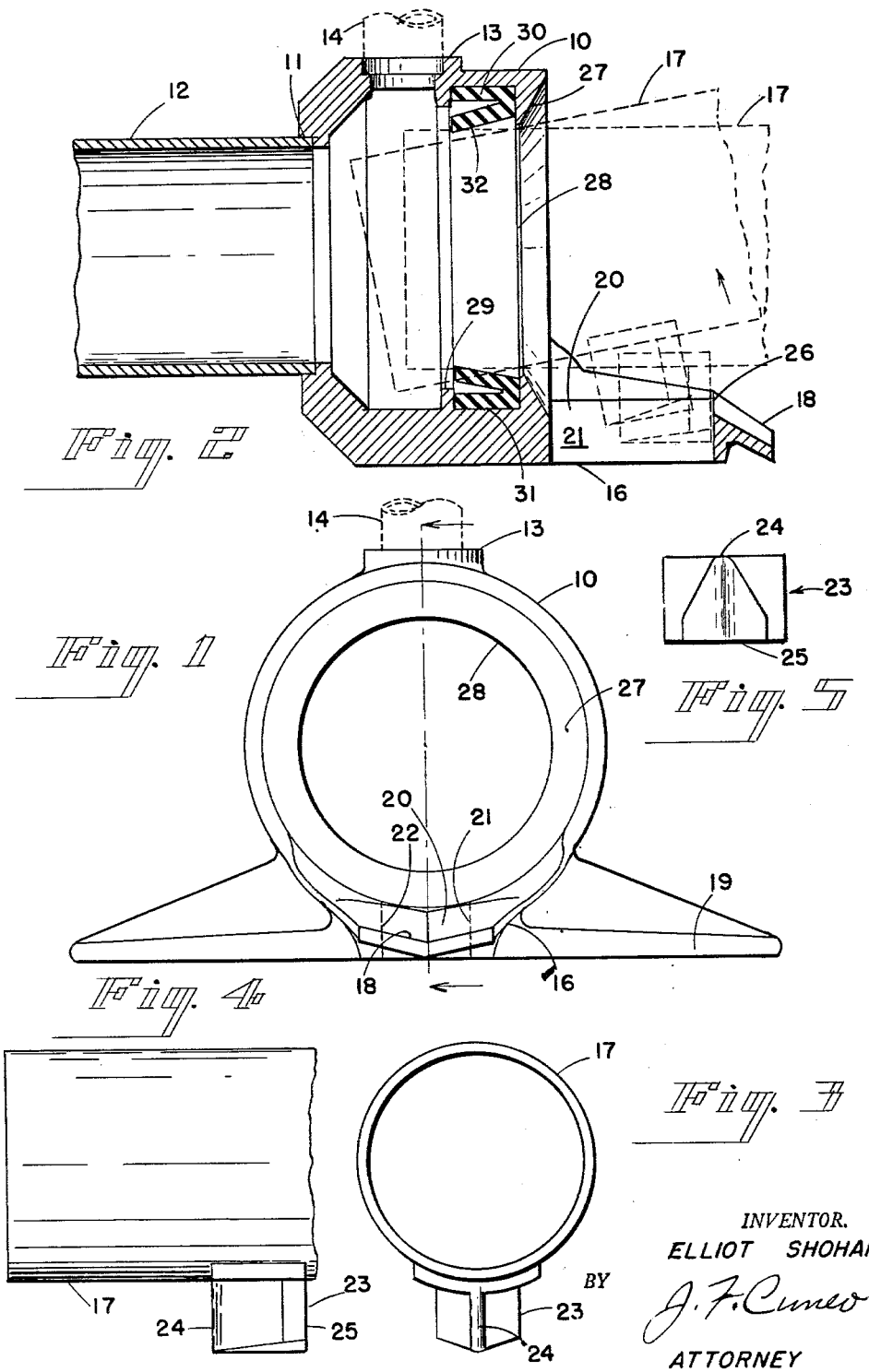
INVENTOR.
ELLIOT SHOHAN
BY
J. F. Cuneo
ATTORNEY

INVENTOR.
ELLIOT SHOHAN

United States Patent Office 3,162,469
Patented Dec. 22, 1964

3,162,469
PIPE COUPLER
Elliot Shohan, 4828 Mountain View,
San Bernardino, Calif.
Filed Feb. 14, 1961, Ser. No. 89,317
3 Claims. (Cl. 285—5)

This invention relates to a novel coupling for above ground irrigation pipe and particularly to a flexible type of coupling adapted to rapidly connect together lengths of irrigation pipe.

Piping for irrigation purposes is ordinarily constructed of thin wall metal tubing, such as aluminum tubing, and is made up in lengths that are generally forty feet to the section. Such tubing requires a coupler element at each pipe junction and the coupling must be flexible so as to allow for some angular misalignment of the tubes without causing leakage at the joints. Such a coupling permits the pipes to follow the contour of the surface where the piping is set up. Since such piping must be frequently taken down and re-assembled at a new location, it is essential that the coupling means be simple in construction, easy to operate, rugged and sturdy so that the coupler will not become broken or damaged. The flexible connection must furthermore be capable of withstanding relatively high water pressure without leakage.

I have provided a simple, sturdy and inexpensive coupler that permit rapidly coupling and uncoupling of sections of thin walled irrigation type piping and will securely connect adjoining sections of pipe whenever such adjoining sections are substantially in longitudinal alignment with each other. This coupler comprises a hollow cylindrical barrel to which is secured one end of a pipe section. The barrel has a guide lip extending outwardly from the lower portion of the open end of the barrel and a V-shaped ramp projects outwardly from the guide lip. The guide lip is provided with a recess that is designed to receive and engage a cooperating lug that is secured near the cooperating end of the adjoining pipe section. The lug extends laterally from the pipe and has a leading edge that is shaped to permit the lug to slide up the V-shaped ramp and guide the end of the pipe, when it is remotely supported by the operator at an angle with the horizontal axis of the pipe secured to the barrel, onto the guide lip and thence into the open end of the barrel and into the flexible gasket located within the barrel. The lug is adapted to engage the recess when the free end of the pipe is lowered to allow the pipe to lie so that its longitudinal axis forms a slight angle with the longitudinal axis of the coupler barrel or lies substantially parallel to it. The sections of pipe may be disengaged by simply raising the end of the last section until it permits the lug to be free of the recess and then pulling the pipe outwardly from the coupler.

A purpose of this invention is to provide a hitching structure that can be easily and rapidly coupled and uncoupled, the structure being designed to permit such coupling and uncoupling while the operator is supporting the pipe section at a position remote from the coupler barrel.

Another purpose of this invention is to provide a coupler element that is suitably for interconnecting thin walled flexible joint pipe that is simply in construction, rugged, durable, and inexpensive to manufacture.

A further purpose of this invention is to provide a coupler means that will permit coupling of adjoining sections of pipe by simply inserting the pipe in the barrel of the coupler while holding the pipe at an angle, with the lug pointing down and lowering the pipe until the longitudinal axis of the terminal section is at substantially the same angle as the longitudinal axis of the preceding section. Uncoupling is accomplished by simply raising the free end of the terminal section of pipe until it clears the recess in the adjacent section barrel, and then withdrawing the pipe and lug out of the barrel.

Other specific purposes and features of the invention will become apparent from the detailed description which follows and reference to the accompanying drawings, in which FIGURE 1 is a front plan view of the coupler barrel showing the opening through which the pipe is inserted, including a base.

FIGURE 2 is a cross section view taken on line 2—2 of FIG. 1. The coupling and uncoupling operation is shown by the dotted lines.

FIGURE 3 is an end view of the pipe to be introduced into the barrel shown in FIGURE 2, including the engaging lug.

FIGURE 4 is a view showing the end portion of the terminal section of pipe and the position of the lug with respect to the end.

FIGURE 5 is a plan view looking at the bottom of an engaging lug before it is secured to the end portion of a pipe.

Figure 6:
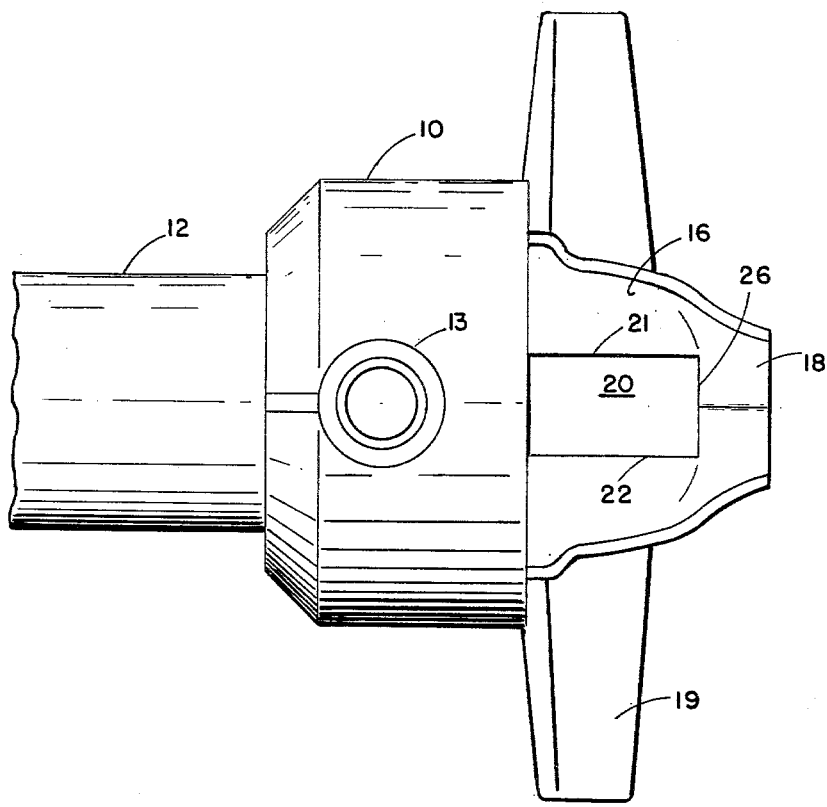
FIGURE 6 is a top plan view of the barrel shown in FIGURE 2.

Referring to the drawings, FIGURES 1 and 2 show a preferred form of coupler comprising a cylindrical barrel 10 having an opening 11 adapted to receive one end of pipe 12. Pipe 12 is preferably welded to opening 11 and the coupler is thereby secured to pipe 12 at all times. It is to be understood that pipe 12 can be secured to barrel 10 by any other satisfactory means such as clamps, and any other suitable securing means associated with the barrel.

The inner central portion of barrel 10 has extending outwardly therefrom a boss 13 adapted to receive a riser 14 to which may be attached a sprinkler, not shown. The forward end of barrel 10 has extending outwardly therefrom a lip 16 that is located at the bottom portion of the barrel and continues a short distance up the side. Lip 16 preferably follows the contour of the end of the barrel and is intended to guide and support the circular end of a cooperating pipe 17. The outer end of lip 16 merges into a substantially V-shaped ramp 18 that extends downwardly from lip 16 a substantial distance.

The forward end of barrel 10 is generally provided with a relatively wide foot 19 that extends laterally to the longitudinal axis of the barrel a suitable distance on each side.

Lip 16 is provided with a recess 20 that in FIGURES 1, 2, and 6 is shown extending through lip 16. Recess 20 may also be made only extending into lip 16 but not through it if this is desired, so long as it is deep enough to engage a lug. Side wall 21 of the recess 20 as well as side wall 22 are both substantially perpendicular to the horizontally extending foot or base 19. Preferably recess 20 extends lengthwise from the open end of the barrel to the beginning or upper end of ramp 18.

Cooperating pipe 17 has secured to it near its end a lug 23 that is secured to the wall of the pipe and extends laterally from the outer wall of the pipe. The maximum width of lug 23 corresponds to the distance between the side walls 21 and 22 of recess 20 and is adapted to fit snugly between these walls. The length of lug 23 is approximately half the length of recess 20 to permit longitudinal movement of the lug in the recess. Leading edge 24 of lug 23 is narrow in width having preferably a slight curvature, the lug tapering from its maximum width and increasing slightly in depth as it approaches the leading edge; this is to assist the lug in following the trough formed by the V-shaped ramp and to be guided by the ramp into the lip 16. Rearward end 25 of lug 23 corresponds to the forward surface 26 of recess 20. In the drawings surface 26 is shown to be rectangular and perpendicular to the sides, however, the forward face of recess 20 could be any other desired configuration such as triangular, curved, etc. The forward face 26 of recess 20, could also be inclined from the vertical instead of vertical, for example face 26 could slope downwardly toward the outer end of the ramp, and in that case the forward face 25 of lug 23 would be sloped accordingly.

Barrel 10 is provided with a short frusto-conical surface 27 that leads from lip 16 to opening 28. Inside barrel 10 there is formed an internal gasket sealing ring groove 29 that is adjacent the open end. A flexible sealing ring 30 that is formed substantially V-shaped in cross section as shown in FIGURE 2, is seated in groove 29. One surface 31 of sealing ring 30 is forced against the wall of barrel 10 when under water pressure and the other surface 32 adjacent opening 28 receives the end of pipe 17 when it is inserted. Water pressure forces flexible lip 32 against the outer wall of pipe 17 and prevents leakage.

The manner in which the device operates is as follows: A length of pipe having its end secured to the smaller opening in barrel 10 is laid on the ground so that the base or foot 19 is resting in a substantially horizontal position. A cooperating section of pipe is grasped by the operator and supported by him at a position remote from the end. The forward end 24 of lug 23 is rested on V-shaped ramp 18 and the opposite end of pipe 17 is held at a substantial height above the ground. Lug 23 is pushed forward along ramp 18 and the forward end of pipe 17 will slide along lip 16 as pipe 17 advances toward barrel 10 until it reaches frusto-conical surface 27 which will lead it into opening 28. Here the pipe will engage the inner lip 32 of gasket 30 and will continue to move forward until it has progressed as far as it can go into barrel 10. Lug 23 should be pointing toward recess 20 at this time and will engage recess 20 as the pipe is lowered so that its longitudinal axis corresponds substantially with the longitudinal axis of the coupler barrel. The pipe is then pulled back from the coupler barrel until cooperating surfaces 25 and 26 are in engagement. When the water pressure acts of gasket 30 it will force lips 31 and 32 outwardly against their respective engagement surfaces and will prevent leaks.

To dismantle the system all the operator has to do is to turn off the water pressure and grasp the downstream section of pipe, that is the terminal section and raise the free end until the pipe forms a sufficient angle with the longitudinal axis of the forward section so that the lug can clear recess 20 and then withdraw the pipe a short distance to clear the barrel.

The advantages of my invention are that a secure coupling is quickly achieved by simply raising the cooperating section of pipe, inserting the forward end into the barrel and then lowering the pipe. No turning or twisting of the pipe is required and no complicated locks or hooks are needed. My construction makes available the simplest type of coupler that has been manufactured up to the present time. The guide ramp and lip enable the operator to easily place the pipe from a remote point and permit its easy insertion into the coupler barrel even though the operator is standing from 20 to 25 feet from the end of the pipe.

Various alterations may be made in the details of construction without departing from the scope of the present invention as defined by the following claims.

I claim:

1. A pipe coupling combination for two adjacent sections of above ground irrigation pipe comprising: a hollow cylindrical barrel at the forward end of one pipe section; a trough extending forwardly from the bottom portion of the open end of said barrel; wall means defining a recess in said trough one of said wall means being adjacent the forward end thereof, the side walls of the recess being substantially vertical; a downwardly inclined ramp extending from the forward end of said trough, said ramp being substantially V-shaped in transverse cross section, the internal ridge of said V-shaped ramp being alined with said recess and extending longitudinally from the forward end of said trough; a lug member secured in spaced relationship with the free end of said adjacent pipe section and extending downwardly and normally therefrom, the length of said lug member extending longitudinally along said adjacent pipe section being shorter than the length of said recess, said lug member having a rear end portion adapted to abut the forward end wall portion of the recess and having a maximum width adapted to be snugly received between the side walls of the recess, the forward end portion of the lug being tapered to a narrow width to permit it to engage and be slidably guided by the internal ridge of the V-shaped ramp into said recess, said lug member being engaged by the wall portions of the recess when the end of the adjacent pipe section is inserted in the cylindrical barrel and the longitudinal axis of the adjacent pipe section is moved downwardly to place it in substantially axial alinement with said cylindrical barrel, thereby locking the two adjacent pipe sections together.

2. A pipe coupling combination for two adjacent sections of above ground irrigation pipe comprising: a hollow cylindrical barrel at the forward end of one pipe section; a trough extending forwardly from the bottom portion of the open end of said barrel; wall means defining a recess in said trough, one of said wall means being adjacent the forward end thereof, the side walls of the recess being substantially vertical; a downwardly inclined ramp extending from the forward end of said trough, said ramp being substantially V-shaped in transverse cross section, the internal ridge of said V-shaped ramp being alined with said recess and extending longitudinally from the end of said trough; a lug member secured to said adjacent pipe section in spaced relationship to the free end of said pipe section and extending downwardly and normally therefrom, the length of said lug member extending longitudinally along said adjacent pipe section being shorter than the length of said recess, said lug member having a rear end portion adapted to abut the forward end wall portion of the recess and having a maximum width adapted to be snugly received between the side walls of the recess, the forward end portion of the lug being tapered to a narrow width to permit the end to be engaged and be slidably guided by the internal ridge of the V-shaped ramp into said recess, said lug member having the surface opoposite to the surface attached to said adjacent pipe section V-shaped, the ridge of said V extending from the forward thin end of said lug to the rear end, the lug having its maximum thickness along said ridge, the lug member being engaged by the wall portions of the recess when the end of the adjacent pipe section is inserted in the cylindrical barrel and the longitudinal axis of said cooperating pipe section is moved downwardly placing it in substantially axial alinement with the axis of said cylindrical barrel, thereby locking the two adjacent pipe sections together.

3. A pipe coupling combination for two adjacent sections of above ground irrigation pipe comprising: a hollow cylindrical barrel at the forward end of one pipe section; an internal annular groove at the forward portion of said barrel adjacent the forward end thereof; resilient sealing means in said groove; a trough extending forwardly from the bottom portion of the open end of said barrel; wall means defining a recess in said trough one of said wall means being adjacent the forward end thereof, the side walls of the recess being substantially vertical; a downwardly inclined ramp extending from the forward end of said trough, said ramp being substantially V-shaped in transverse cross section, the internal ridge of said V-shaped ramp being alined with said recess and extending longitudinally from the forward end of said trough; a lug member secured in spaced relationship to the free end of said adjacent pipe section and extending downwardly and normally therefrom, the length of said lug member extending longitudinally along said adjacent pipe section being shorter than the length of said recess, said lug member having a rear end portion adapted to abut the forward end wall portion of the recess and having a maximum width adapted to be snugly received between the side walls of the recess, the forward end portion of the lug being tapered to a narrow width to permit it to engage and be slidably guided by the internal ridge of the V-shaped ramp into said recess, said lug member being engaged by the wall portions of the recess when the end of the adjacent pipe sections is inserted in the cylindrical barrel and the longitudinal axis of the adjacent pipe section is moved downwardly placing it is substantially axial alinement with said cylindrical barrel, thereby locking the adjacent pipe sections together.

References Cited in the file of this patent

UNITED STATES PATENTS

| | | |
|---|---|---|
| 2,470,539 | Wyss | May 17, 1949 |
| 2,670,222 | Dragon | Feb. 23, 1954 |
| 2,874,979 | Shohan | Feb. 24, 1959 |

FOREIGN PATENTS

| | | |
|---|---|---|
| 161,546 | Austria | Mar. 1, 1955 |
| 195,701 | Austria | Feb. 25, 1958 |
| 207,187 | Austria | Jan. 25, 1960 |
| 558,880 | Canada | June 17, 1958 |
| 566,628 | Italy | Sept. 13, 1957 |